US009291201B2

(12) United States Patent
Mola et al.

(10) Patent No.: US 9,291,201 B2
(45) Date of Patent: Mar. 22, 2016

(54) TUBULAR BUSHING CO-MOLDABLE WITH TUBS OF WASHING MACHINES

(71) Applicants: Roberto Mola, Turin (IT); Riccardo Restivo, Turin (IT); Gianpiero Scaltriti, Turin (IT)

(72) Inventors: Roberto Mola, Turin (IT); Riccardo Restivo, Turin (IT); Gianpiero Scaltriti, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/485,920

(22) Filed: Sep. 15, 2014

(65) Prior Publication Data

US 2015/0078695 A1 Mar. 19, 2015

(30) Foreign Application Priority Data

Sep. 13, 2013 (IT) .............................. TO2013A0744

(51) Int. Cl.
*F16C 35/04* (2006.01)
*F16C 33/76* (2006.01)
*D06F 37/00* (2006.01)

(52) U.S. Cl.
CPC .............. *F16C 35/042* (2013.01); *D06F 37/00* (2013.01); *F16C 33/76* (2013.01)

(58) Field of Classification Search
CPC ...... F16C 33/042; F16C 35/04; F16C 35/061; F16C 35/067; D06F 37/00; D06F 7/262; B29C 39/00; B29C 45/14836
USPC .......... 384/440, 476–478, 504, 535, 548, 584
See application file for complete search history.

(56) References Cited

U.S. PATENT DOCUMENTS

| | | | |
|---|---|---|---|
| 3,628,514 A | 12/1971 | Phillips | |
| 4,423,540 A * | 1/1984 | Hishida | 384/585 |
| 8,297,084 B2 * | 10/2012 | Park et al. | 68/140 |
| 8,464,678 B1 | 6/2013 | Iskenderian et al. | |
| 8,590,347 B2 * | 11/2013 | Mola et al. | 68/140 |
| 2002/0059817 A1 * | 5/2002 | Heyder et al. | 68/140 |
| 2006/0191301 A1 * | 8/2006 | Park et al. | 68/140 |
| 2007/0113596 A1 * | 5/2007 | Kim et al. | 68/140 |
| 2009/0113941 A1 * | 5/2009 | Kim | 68/140 |
| 2013/0213181 A1 | 8/2013 | Dorn et al. | |

FOREIGN PATENT DOCUMENTS

| | | | | |
|---|---|---|---|---|
| DE | 10350794 A1 * | 6/2005 | | B29C 45/14 |
| EP | 0615056 A1 | 9/1994 | | |
| EP | 1607505 A2 * | 12/2005 | | H02K 1/00 |
| EP | 1767684 A1 * | 3/2007 | | D06F 37/00 |
| EP | 1950334 A1 * | 7/2008 | | D06F 37/26 |
| WO | WO 2008054156 A1 * | 5/2008 | | D06F 37/20 |
| WO | WO 2010010114 A3 * | 5/2010 | | D06F 37/26 |
| WO | 2010139663 A1 | 12/2010 | | |

* cited by examiner

*Primary Examiner* — Marcus Charles
(74) *Attorney, Agent, or Firm* — Bryan Peckjian; SKF USA Inc. Patent Dept.

(57) ABSTRACT

A tubular bushing that is co-moldable with tubs of washing machines, the tubular bushing is engaged by a drive shaft of the washing machine, that extends along a central axis (A) and is provided with two rolling bearings, arranged at a given distance from each other along the axis (A) to rotatably support the drive shaft of the washing machine with respect to the tub. The tubular bushing further provides a containing sleeve, made of plastic material and co-molded around the two bearings; the sleeve defining an axial communication duct between two sides of the tubular bushing, the duct being closed, at least during co-molding, by a disposable cap, engaged in an annular edge of the containing sleeve.

8 Claims, 1 Drawing Sheet

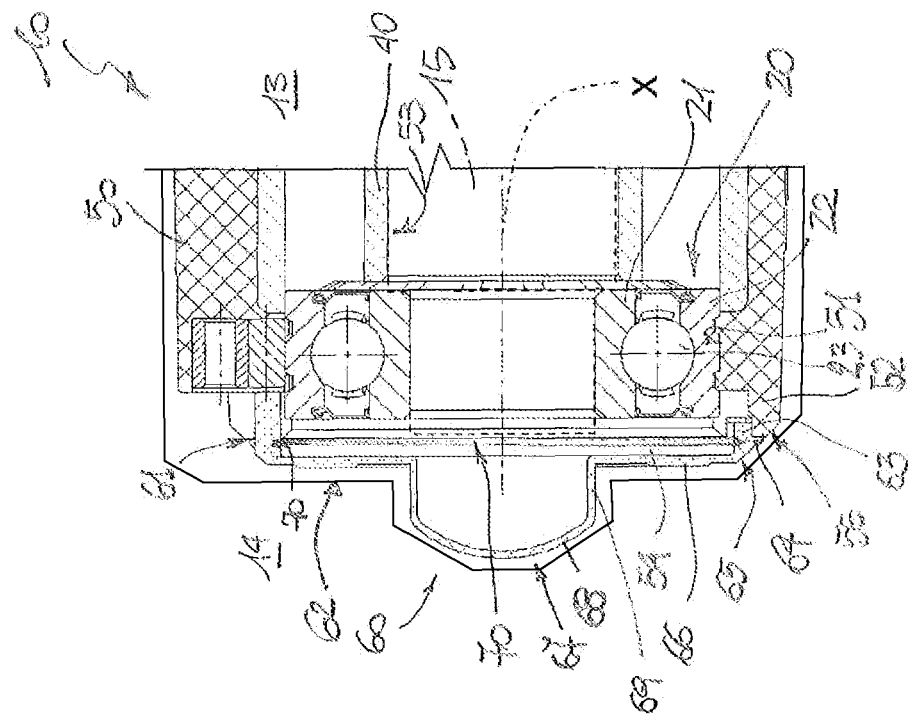
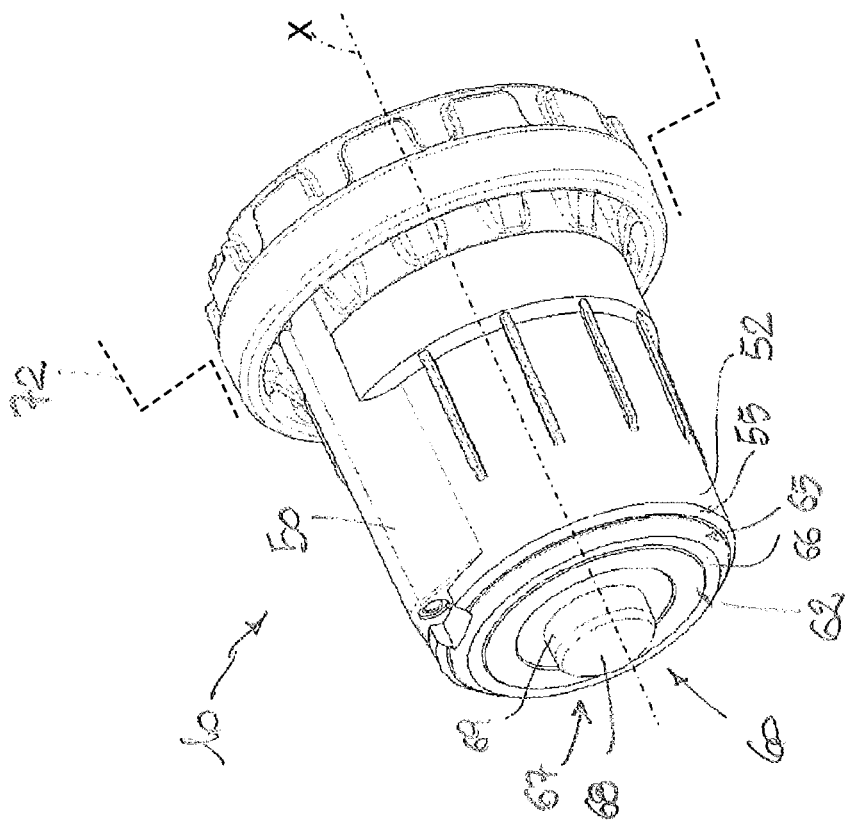

TUBULAR BUSHING CO-MOLDABLE WITH TUBS OF WASHING MACHINES

CROSS-REFERENCE TO RELATED APPLICATIONS

This application claims priority to Italian Patent Application No. TO2013A000744 filed Sep. 13, 2014, the contents of which are herein fully incorporated by reference.

FIELD OF THE INVENTION

The present invention is related to a tubular bushing co-moldable with tubs of washing machines.

BACKGROUND OF THE INVENTION

Known tubular bushings, co-moldable with tubs of washing machines, are suitable to be engaged by a drive shaft of the washing machine, in order to support, by means of the drive shaft, the rotatable drum inside the tub. Known tubular bushings comprise two rolling bearings, to allow a rotation of the drive shaft, and a containing sleeve, which is made of plastic, by means of co-molding around the two bearings and defining through the tubular bushing, an axial communication duct, open at both sides of the tubular bushing.

Such known tubular bushings are suitable to be co-molded with tubs of washing machines, to simplify the production process of the washing machines. In particular, the bushing containing sleeve is co-molded together with tubs of washing machines, so as to realize one piece with the tubs, allowing remarkable savings in process time, handling time and components number.

During the co-molding of the tub with the tubular bushing, the tubular bushing is located inside a mold, in a vertical position, and the axial communication duct is closed at least on the upper side, in other words, the opposite side with respect to the side which will be engaged by the drive shaft of the washing machine, by means of suitable baffles. The baffles are located inside the mold, but cannot ensure duct sealing or simplification of the co-molding process.

SUMMARY OF THE INVENTION

The aim of the present invention is to realize a tubular bushing co-moldable with tubs of washing machines, the tubular bushing allowing to simplify molds for co-molding with tubs of washing machines, both ensuring a full protection of the bushing bearings during co-molding and improving the co-molding material flux, without requiring more expensive production costs.

According to the present invention, a tubular bushing co-moldable with tubs of washing machines is realized, the tubular bushing having the characteristics as in the enclosed independent claim.

Further embodiments of the invention, preferred and/or particularly advantageous, are described according to the characteristics as in the enclosed dependent claims

BRIEF DESCRIPTION OF THE DRAWINGS

A preferred embodiment of the invention will be now described, in an exemplifying and not limitative way, by reference to the enclosed drawing, in which:

FIG. 1 is a perspective view of a preferred embodiment of the tubular bushing according to the present invention;

FIG. 2 shows, in an enlarged scale, a longitudinal section, with some parts taken away for clarity, of the tubular bushing of FIG. 1.

DETAILED DESCRIPTION OF THE INVENTION

With reference to FIGS. 1 and 2, in such drawings is shown as a whole a tubular bushing 10 co-moldable with a tub 72 of a washing machine (known and not shown), to support, in a rotatable way around a central axis X of rotation, a drive shaft 15 (shown as a dotted line) of a drum (known and not shown) of the washing machine.

The tubular bushing 10 extends along the axis X between a side 13, so called "humid", being close to the mentioned tub and a side 14, so called "dry", being close to the washing machine outside, and comprises:

two rolling bearings 20 (only one of them is shown) located along the axis X and engaged by the drive shaft 15 to allow the rotation of the drive shaft 15 with respect to the mentioned tub; and a spacer 40 axially interposed between the two bearings 20, defining a structural stiff element of the tubular bushing 10.

The bearing 20, located on the dry side 14, comprises a rotatable inner ring 21, engaged by the drive shaft 15, a stationary outer ring 22 and a plurality of rolling bodies 23, interposed between the rings 21 and 22. Both the rings 21 and 22, the rolling bodies 23 and the drive shaft 15 are made of metal material, anyhow of electrically conductive material.

Moreover, the tubular bushing 10 comprises a containing sleeve 50, which is made of plastic material, is co-molded around the two bearings 20 and the spacer 40 and defines a seat 51 for housing the outer ring 22 of the bearing 20, located on the dry side. The containing sleeve 50 comprises an annular edge 52, axially outwards projecting with respect to the seat 51, and also defines, together with the inner rings 21 of the two bearings 20, an axial communication duct 53, which connects the two sides 13 and 14 of the tubular bushing 10 and has its own inlet 54 being confined by the annular edge 52.

To avoid the incoming of plastic material inside the duct 53 through the inlet 54, as well as to protect the integrity of the two bearings 20, during the containing sleeve 50 co-molding process, the tubular bushing also comprises disposable closing means, for example a disposable cap 60, which is engaged in the annular edge 52 for closing the axial communication duct 53 during the co-molding of the tubular bushing with the tub, and is preferably made of plastic material.

The cap 60 comprises a cylindrical body 61, assembled on the annular edge 52, to keep in a fixed position the cap 60, and a shaped end wall 62, steadily fixed to the body 61, so as to completely close the inlet 54. The cylindrical body 61 is provided with a cylindrical edge 63, which is inserted inside the annular edge 52, and an annular protrusion 64, which radially extends towards outside from the edge 63, is steadily fixed to the edge 63 and is axially located close to the annular edge 52, to axially lock the cap 60 with respect to the containing sleeve 50. The protrusion 64 is externally confined by a conical surface 65, which is tapered towards the axis X and the dry side 14 and is co-planar to a conical surface 55, externally confining the annular edge 52.

The shaped end wall 62 comprises an annular plane portion 66, connected to the conical surface 65 and a dome like conveying portion 67, which comprises a spherical central wall 68, externally convex, and a sidewall 69 connecting the wall 68 and the wall 63. The dome-like portion 67, during the co-molding process of the tubular bushing with the tub, allows to convey and better distribute the injected material inside the mold towards the radial periphery of the cap 60, in other words towards the periphery of the containing sleeve 50. Also surfaces 65 and 55, with their conical shape, contribute to improving such distribution, thus improving the injected material flow towards the periphery of the containing sleeve 50.

As shown in FIG. 2, the disposable cap 60 also comprises a weakening groove 70, formed internally along the cylindrical body 61 for facilitating removal of the cap 60 once co-molding has been performed. In fact, once co-molding has been completed, the cap 60 is no more needed and, therefore, must be removed: the groove 70 allows a fast removal, since it defines a thin section along the cylindrical body 61. In a very simple way, the removal of the cap 60 can be carried out, by applying an impact force against a side of the cap 60, thus causing a clear detachment along the groove 70. The detached cap 60 and the portion of the injected material, which has adhered to the cap 60, can easily be recycled and re-used, for realizing further caps 60, thus improving the environmental sustainability.

Other than the embodiments of the invention, as above disclosed, it is to be understood that a vast number of variations exist. It should also be appreciated that the exemplary embodiment or exemplary embodiments are only examples and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A tubular bushing configured to be co-moldable with a tub of a washing machine, the tubular bushing having a central axis and comprising:
   two rolling bearings arranged at a given distance from each other along the central axis to rotatably support a drive shaft of the washing machine;
   a containing sleeve arranged around the two rolling bearings and provided with an annular edge projecting with respect to one rolling bearing of the two rolling bearings, wherein:
      the containing sleeve defines, together with the two rolling bearings, an axial communication duct between two sides of the tubular bushing; and
      an inlet of the communication duct is defined by the annular edge; and
   disposable closing means engaging the annular edge to close the axial communication duct during co-moulding of the tubular bushing together with the washing machine tub.

2. The tubular bushing according to claim 1, wherein the closing means comprises plastic and provides a cylindrical body engaging in the annular edge and a shaped end wall integral with the cylindrical body.

3. The tubular bushing according to claim 2, wherein the closing means further comprises a weakening groove formed internally along the cylindrical body for facilitating removal of the closing means once co-molding has been performed.

4. The tubular bushing according to claim 2, wherein the shaped end wall further comprises a dome-like conveying portion configured to distribute a co-molding material during a co-molding process.

5. A tubular bushing configured to be co-moldable with a tub of a washing machine, the tubular bushing having a central axis and comprising:
   two rolling bearings arranged at a given distance from each other along the central axis to rotatably support a drive shaft of the washing machine;
   a containing sleeve arranged around the two rolling bearings and provided with an annular edge projecting with respect to one rolling bearing of the two rolling bearings, wherein:
      the containing sleeve defines, together with the two rolling bearings, an axial communication duct between two sides of the tubular bushing; and
      an inlet of the communication duct is defined by the annular edge; and
   a disposable cap engaging the annular edge to close the axial communication duct during co-moulding of the tubular bushing together with the washing machine tub.

6. The tubular bushing according to claim 5, wherein the disposable cap comprises plastic and provides a cylindrical body engaging in the annular edge and a shaped end wall integral with the cylindrical body.

7. The tubular bushing according to claim 6, wherein the disposable cap further comprises a weakening groove formed internally along the cylindrical body for facilitating removal of the disposable cap once co-molding has been performed.

8. The tubular bushing according to claim 6, wherein the shaped end wall further comprises a domed conveying portion configured to distribute a co-molding material during a co-molding process.

* * * * *